US008016342B2

(12) United States Patent
Durocher

(10) Patent No.: US 8,016,342 B2
(45) Date of Patent: Sep. 13, 2011

(54) VIBRATION DAMPENER WITH FLOATING POSITIVE MECHANICAL CONNECTION

(75) Inventor: Richard R. Durocher, LaSalle (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/605,351

(22) Filed: Oct. 25, 2009

(65) Prior Publication Data
US 2011/0095570 A1   Apr. 28, 2011

(51) Int. Cl.
*B60J 7/00* (2006.01)
(52) U.S. Cl. ........................................................ 296/72
(58) Field of Classification Search ............. 296/193.02, 296/72, 70; 180/90
See application file for complete search history.

(56) References Cited

U.S. PATENT DOCUMENTS

| | | | |
|---|---|---|---|
| 2,549,925 A | 4/1951 | Paton | 74/493 |
| 2,741,324 A | 4/1956 | Anderson | 180/90 |
| 3,181,850 A | 5/1965 | Bajer | 267/153 |
| 3,211,491 A | 10/1965 | Browne | 296/1.03 |
| 3,300,229 A | 1/1967 | Kishline | 280/780 |
| 3,789,945 A * | 2/1974 | Hansen | 180/69.2 |
| 3,918,541 A * | 11/1975 | Krieger | 180/69.22 |
| 4,767,153 A * | 8/1988 | Kawasaki et al. | 296/193.02 |
| 5,951,087 A | 9/1999 | Bittinger | 296/72 |
| 6,692,026 B2 | 2/2004 | Gianaris | 280/779 |
| 6,851,742 B1 * | 2/2005 | Kubiak | 296/193.02 |
| 2006/0017310 A1 | 1/2006 | Joo et al. | 296/193.02 |

FOREIGN PATENT DOCUMENTS

| | | |
|---|---|---|
| DE | 19728557 | 1/1998 |
| DE | 10247492 | 4/2004 |
| DE | 10323724 | 12/2004 |

* cited by examiner

*Primary Examiner* — Joseph Pape
(74) *Attorney, Agent, or Firm* — Frederick Owens, Esq.; Miller Law Group, PLLC

(57) ABSTRACT

A support brace supports the instrument panel above the floor pan of an automotive chassis and includes a lap joint that dampens the transmission of low range vibrations through the support brace to the instrument panel. The support brace is formed in two pieces, an upper member and a lower member, that have an overlap section between them, where an elastomeric pad joins the two members. The elastomeric pad can be bonded to the overlap sections or joined with rubber buttons inserted through holes formed in the overlap sections. The overlap sections are vertically spaced above the floor pan to position the elastomeric pad above the heat generated by the vehicle exhaust system. A floating positive mechanical connection in the form of an interlocking tab on one member engaged through an opening in the other member, which stays out of metal to metal contact unless the elastomeric pad fails.

18 Claims, 6 Drawing Sheets

VIBRATION DAMPENER WITH FLOATING POSITIVE MECHANICAL CONNECTION

FIELD OF THE INVENTION

This invention relates to the support of automotive components on support braces, and, more particularly, to a support brace structure that will dampen the vibrations transmitted to the component, such as the instrument panel, of the vehicle being mounted to the support brace.

BACKGROUND OF THE INVENTION

The instrument panel of an automotive vehicle is supported above the floor pan of the vehicle by a centrally positioned support brace that extends upwardly from the floor pan hump to connect with the central part of the instrument panel. Low frequency vibrations, e.g. vibrations in the range of 25-75 Hz, can be transmitted from the floor pan, through the central support brace and into the instrument panel, where this low frequency vibration can be felt by the operator through the steering wheel. Although this vibration is detected via gripping the steering wheel, this low range vibration is chassis generated and transmitted from the floor pan through the instrument panel supports to the cross car beam and, ultimately, to the steering wheel. This low range vibration should be suppressed.

The steering column is isolated from the instrument panel by rubber seals and rubber grommets in U.S. Pat. No. 2,549,925, issued to Clyde Paton on Apr. 24, 1951, and in U.S. Pat. No. 3,300,229, issued to Floyd Kishline on Jan. 24, 1967, to restrict the transmission of vibrations from the instrument panel and related structure to the steering column, and ultimately transmission to the steering wheel to be detected by the operator. In U.S. Pat. No. 2,741,324, granted to Ralph Anderson on Apr. 10, 1956, the instrument panel is supported by a rubber grommet that connects to the windshield frame to prevent the transmission of vibrations and shocks to the instrument panel. Interrupting the transmission of vibrations through the vehicle body through rubber isolating body mounts is well known in the automotive art, such as is reflected in U.S. Pat. No. 3,181,850, issued on May 4, 1965, to Jacques Bajer.

Energy absorbing members formed of elongated steel straps which sandwich a viscoelastic pad between them have been used in controlling body shake in automobiles, as is disclosed in U.S. Pat. No. 3,211,491, granted on Oct. 12, 1965, to Horace Browne, et al. In the Browne structure, the two steel straps can be fastened together with rivets or bolts so that the elastomeric pad between the two steel straps can absorb shake energy at the front end of the vehicle. In U.S. Pat. No. 5,951,087, issued to D. Scott Bittinger on Sep. 14, 1999, a rubber boot is configured to secure the underside of the instrument panel and to receive the cross car beam to limit the transmission of vibrations between the cross car beam and the instrument panel. The steering column can also be vibrationally isolated by mounting structure that can contain an elastomeric filler material to improve the dampening characteristics of the steering column, as is taught in U.S. Pat. No. 6,692,026, granted on Feb. 17, 2004, to Nicholas Gianaris, et al.

Rubber isolators are used at the bottom of the center support brace structure of an automotive vehicle to prevent vibrations transfers to the support brace, as is shown in U.S. Patent Application Publication No. 2006/0017310 of Jae Kap Joo, et al, published on Jan. 26, 2006. Such dampening structure is not practical in automotive assembly as the installation of the rubber bushings would be very difficult to accomplish. Furthermore, the placement of the elastomeric isolators near the floor pan raises concerns as to the deterioration of the elastomeric members due to heat from the exhaust system that is transmitted through the floor pan. Elastomeric bushings isolate the steering column in U.S. Patent Application Publication No. 2006/0278030, published on Dec. 14, 2006.

It would be desirable to provide a support brace structure that can be utilized in a configuration in which low frequency vibrations are to be prevented from being transmitted to the automotive component being supported by the support braces. It would be desirable if this support brace structure would position the vibration dampening material away from the floor pan without requiring a revision in the current assembly process.

SUMMARY OF THE INVENTION

It is an object of this invention to overcome the disadvantages of the prior art by providing a support brace structure that incorporates an elastomeric pad sandwiched between two members of the support brace to dampen vibrations through the support brace.

It is another object of this invention to provide a support brace structure that can be used in any automotive application to support an automotive component above a vibration generating member to dampen the transmission of the generated vibrations through the support brace.

It is a feature of this invention that the support brace is re-configured into an upper half and a lower half formed with overlapping sections that can be connected together to form a support brace having the same overall dimensions as previously known for the support brace.

It is an advantage of this invention that the re-configured support brace can be substituted into the automotive assembly process without changing the assembly process to accommodate the re-configured support brace.

It is another feature of this invention that the overlapping sections can trap an elastomeric member between them to dampen the transmission of vibrations through the support brace.

It is another advantage of this invention that the elastomeric member can be bonded to the support brace members.

It is still another advantage of this invention that the elastomeric member can be located above the floor pan away from the heat generated by the automotive exhaust system.

It is still another feature of this invention that the hardness and thickness of the elastomeric member can be varied to selectively adjust the dampening effect as desired.

It is yet another advantage of this invention that the amplitude of vibrations passing through the support brace is reduced.

It is a further advantage of this invention that the implementation of this invention into an automotive structure is easily accomplished.

It is still another object to provide a support brace configuration that dampens vibrations passing through the support brace while providing a floating positive mechanical connection between the support brace members.

It is a yet another feature of this invention that the floating positive mechanical connection between the support brace members spans the elastomeric pad that dampens vibrations through the support brace.

It is yet another advantage of this invention that the floating positive mechanical connection between the members of the support brace provides a mechanical support between the support brace members in the event of a catastrophic failure of the elastomeric pad joining the two support brace members together.

It is a further feature of this invention that the floating positive mechanical connection includes an interlocking tab formed on one support brace member to fit through a slot formed in the other support brace member.

It is a further advantage of this invention that the floating positive mechanical connection provides a support between the support brace members in the event of an impact that damages the support brace.

It is still a further advantage of this invention that the tab projecting through the slot in the opposing support brace member does not make a metal to metal contact unless the elastomeric pad between the support brace members fails.

It is still another object of this invention to provide a support brace configuration that dampens vibrations passing through the support brace to the supported automotive component, which is durable in construction, inexpensive of manufacture, carefree of maintenance, facile in assemblage, and simple and effective in use.

These and other objects, features and advantages are accomplished according to the instant invention by providing a support brace for supporting the instrument panel above the floor pan of an automotive chassis that dampens the transmission of vibrations through the support brace to the instrument panel. The support brace is formed in two pieces, an upper member and a lower member, that have an overlap section between them, where an elastomeric pad joins the two members. The elastomeric pad can be bonded to the overlap sections or joined with rubber buttons inserted through holes formed in the overlap sections. The overlap sections are vertically spaced above the floor pan to position the elastomeric pad above the heat generated by the vehicle exhaust system. A floating positive mechanical connection in the form of an interlocking tab on one member engaged through an opening in the other member, which stays out of metal to metal contact unless the elastomeric pad fails. This support brace configuration is particular effective to dampen low range vibrations.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
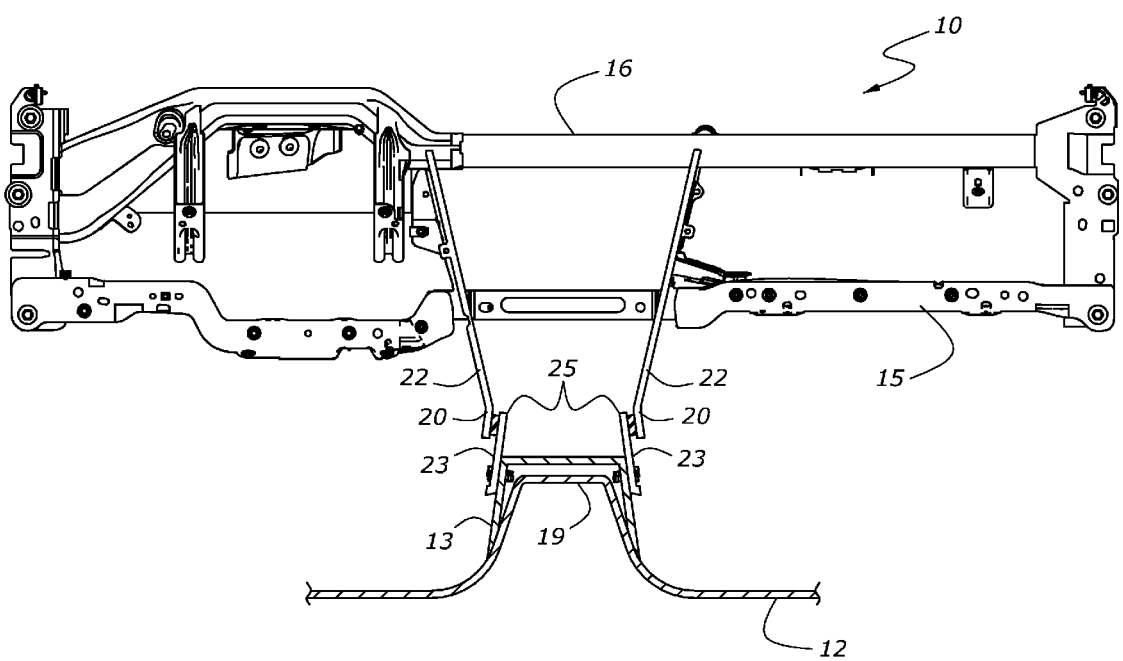
FIG. 1 is a partial rear elevational view of the frame supporting the instrument panel above the floor pan of the vehicle, including the center stack support braces and the cross car beam incorporating the principles of the instant invention.

Referring to FIGS. 1-5, a support brace supporting the instrument panel of an automotive vehicle, incorporating the principles of the instant invention, can best be seen. The frame 10 extends from the vehicle floor pan 12 and stretches laterally across the vehicle to support the instrument panel (not shown), and includes the cross car beam 15 providing structural stability to the vehicle chassis, and the vertically extending center support braces 20. An attachment bracket 13 is welded to the floor pan 12 and provides an attachment point for the support braces 20 on opposite sides of the hump 19, which typically covers the transmission (not shown) and can also cover the drive shaft for rear-driven vehicles.

On each side of the attachment bracket 13, a support brace 20 is attached and projects upward therefrom to attach to the lower cross car beam 15 and the upper cross car beam 16. The steering wheel (not shown) is supported on the lower cross car beam 16 and can, therefore, receive vibrations transmitted from the floor pan 12 through the support braces 20 into the cross car beam 15. Conventional vibration control techniques would suggest the placement of an elastomeric isolator at the connection of the support braces 20 to the attachment bracket 13, as is reflected in the aforementioned U.S. Patent Application Publication No. 2006/0017310. Such dampening structure is not practical in automotive assembly as the installation of the rubber isolators bushings would be very difficult to accomplish and would require a revision in the assembly process. Furthermore, the placement of the elastomeric isolators near the floor pan raises concerns as to the deterioration of the elastomeric members due to heat from the exhaust system that is transmitted through the floor pan 12.

According to the principles of the instant invention, each of the support braces 20 were reconfigured as a two-piece brace member, including an upper member 22 and a lower member 23 overlapping at a lap joint 25. The overall length of the two individual members 22, 23 is greater than the overall length of the original support brace 20, thus permitting the overlap region 25 in each member 22, 23 disposed horizontally with respect to one another. The upper and lower members 22, 23 are bonded to an elastomeric pad 27 that separates the upper and lower members 22, 23 at the lap joint 25 and serves to dampen any vibrations transmitted from the lower member 23 via the floor pan 12 and the attachment bracket 13, to the upper member 22, and then ultimately to the instrumental panel (not shown) and the steering wheel (not shown). Preferably, the elastomeric pad 27 is bonded with adhesives to both the upper and lower members 22, 23, but rubber fasteners could also be utilized to provide a mechanical connection between the upper and lower members 22, 23 without providing a path for the transmission of undampened vibrations.

Since the overall length of the pre-assembled support brace 20, formed from the upper and lower members 22, 23 joined by the elastomeric pad 27 at the overlap region 25 defining the lap joint in the support brace 20, is the same as the conventional one-piece support brace, the assembled support brace 20 can be simply substituted for the conventional support brace without requiring a revision of the assembly process for the frame apparatus 10. The length of the lower member 23 is sufficiently long as to position the lap joint 25 and the elastomeric pad 27 well above the attachment bracket 13 and the floor pan 12 so that the heat generated by the vehicle exhaust system will not deteriorate the elastomeric pad 27 or the adhesives bonding the elastomeric pad 27 to the upper and lower members 22, 23.

As reflected in FIGS. 2-5, the upper member 22 is formed with a T-shaped tab 32 that projects below the elastomeric pad 27 and bends inwardly toward the opposing support brace. The T-shaped tab 32 passes through a corresponding T-shaped opening 33 in the lower member 23 to extend inside the lower member 23. The T-shaped tab 33 passing through the opening 33 forms a floating positive mechanical connection 30 between the upper and lower members 22, 23 to engage in the event of a catastrophic failure of the elastomeric pad 27, as is demonstrated in FIG. 4. The T-shaped tab 32 is shaped so that the T-shaped tab 32 does not make a metal to metal contact with the lower member 23 or the opening 33 passing therethrough, until the elastomeric pad suffers a catastrophic failure. Accordingly, the floating positive mechanical connection 30 provides a fail-safe to keep the cross car beam 15 supported if the elastomeric pad 27 fails, but does not transmit vibration past the elastomeric pad 27.

Figure 2:
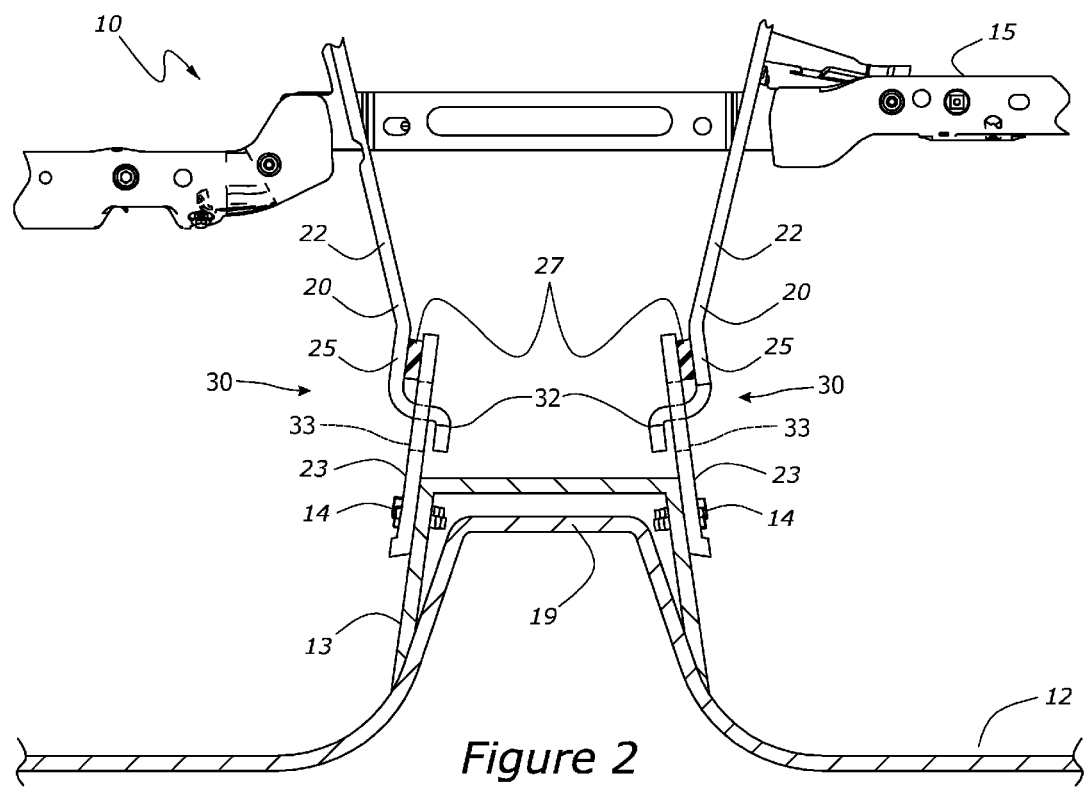
FIG. 2 is an enlarged partial rear elevational view of the center support braces incorporating the principles of the instant invention, connected to the floor pan and the central portion of the cross car beam, the floating positive mechanical connection being shown below the elastomeric pad.
Figure 3:
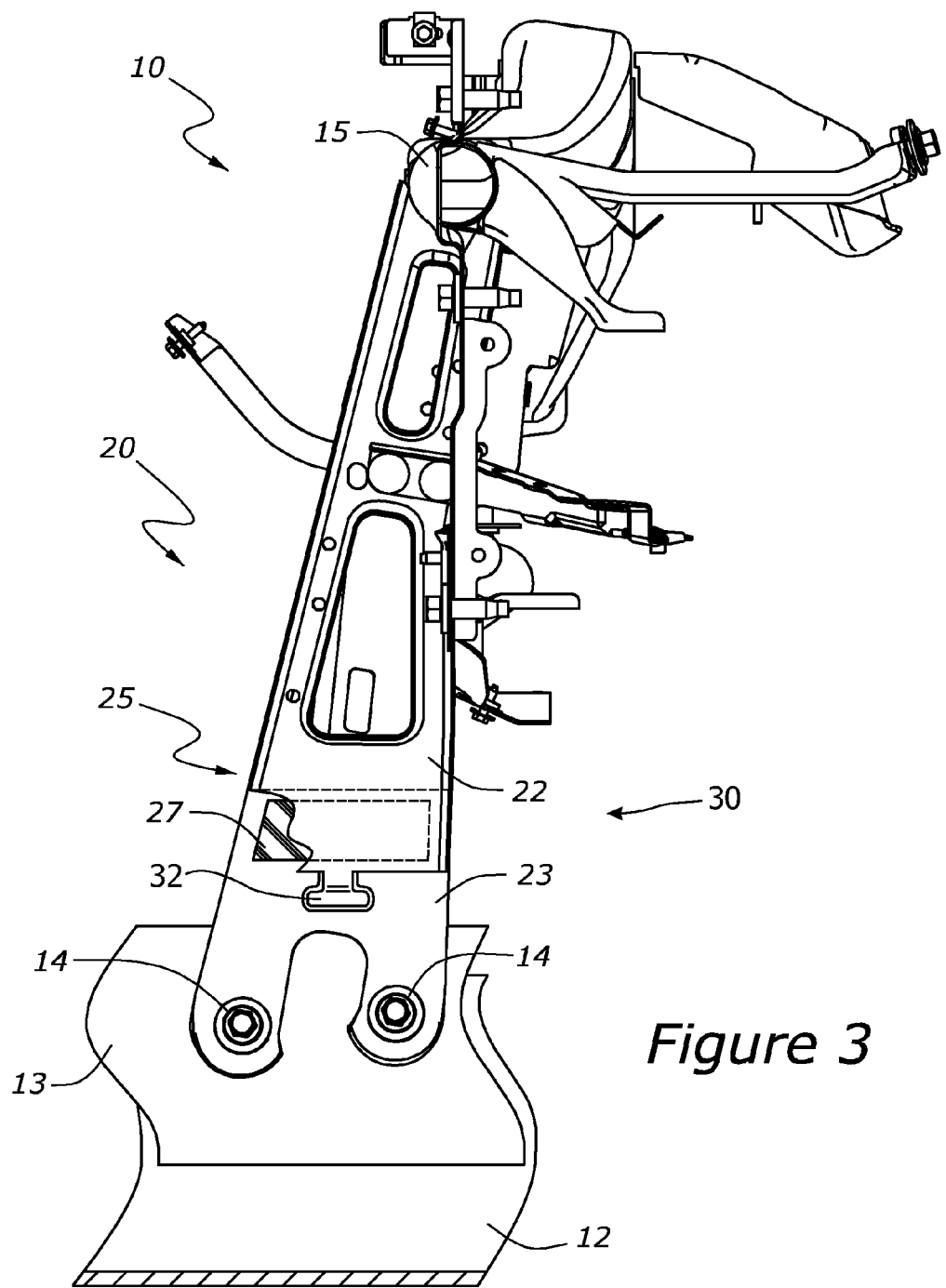
FIG. 3 is an enlarged right side elevational view of the right center support brace as shown in FIG. 2 with a portion of the upper member being broken away to depict the elastomeric pad between the upper and lower members to dampen vibration transmission through the support brace.
Figure 4:
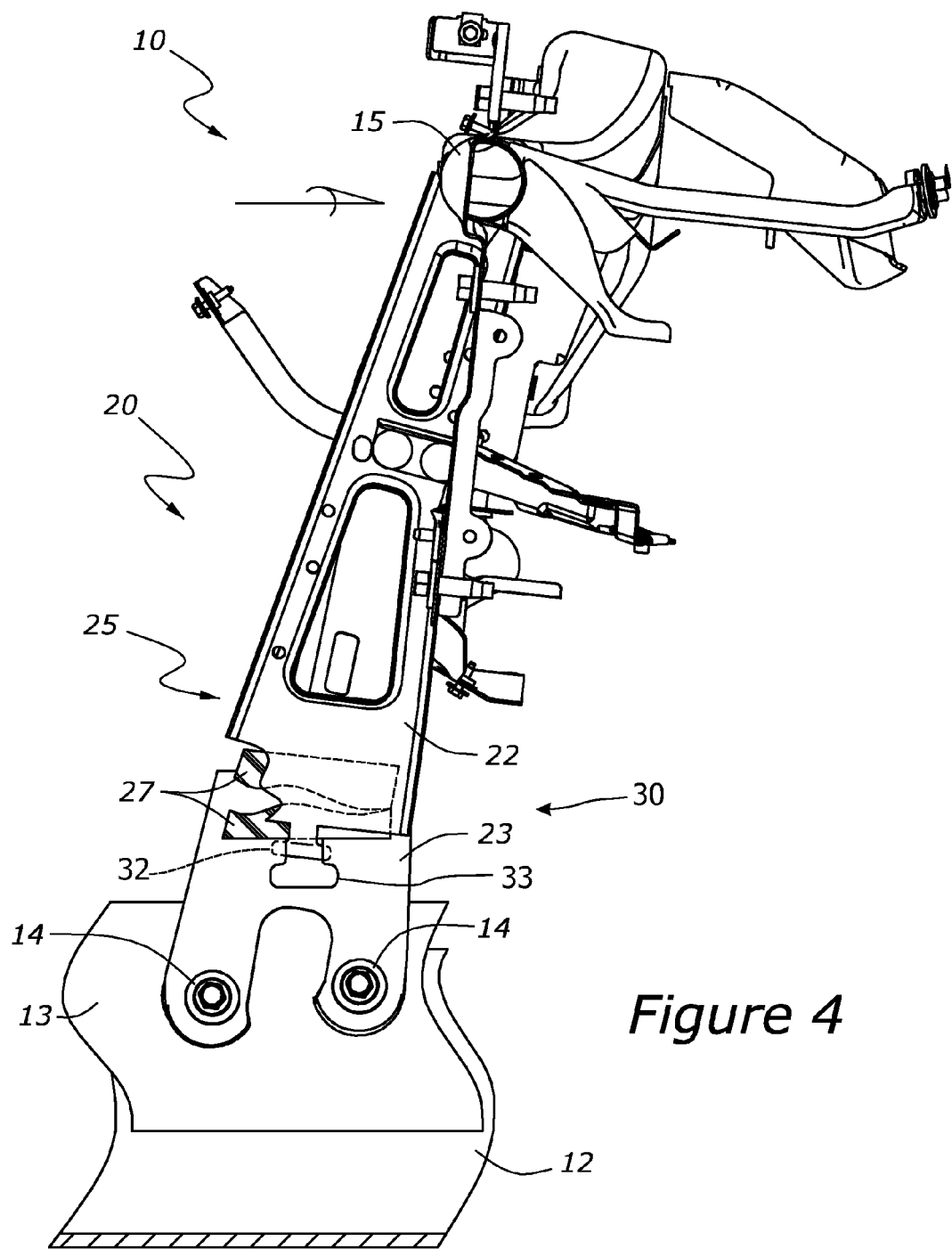
FIG. 4 is an enlarged right side elevational view of the right center support brace as depicted in FIG. 3, but showing an impact causing movement of the upper support brace member to cause catastrophic failure of the elastomeric pad interconnecting the support brace members.
Figure 5:
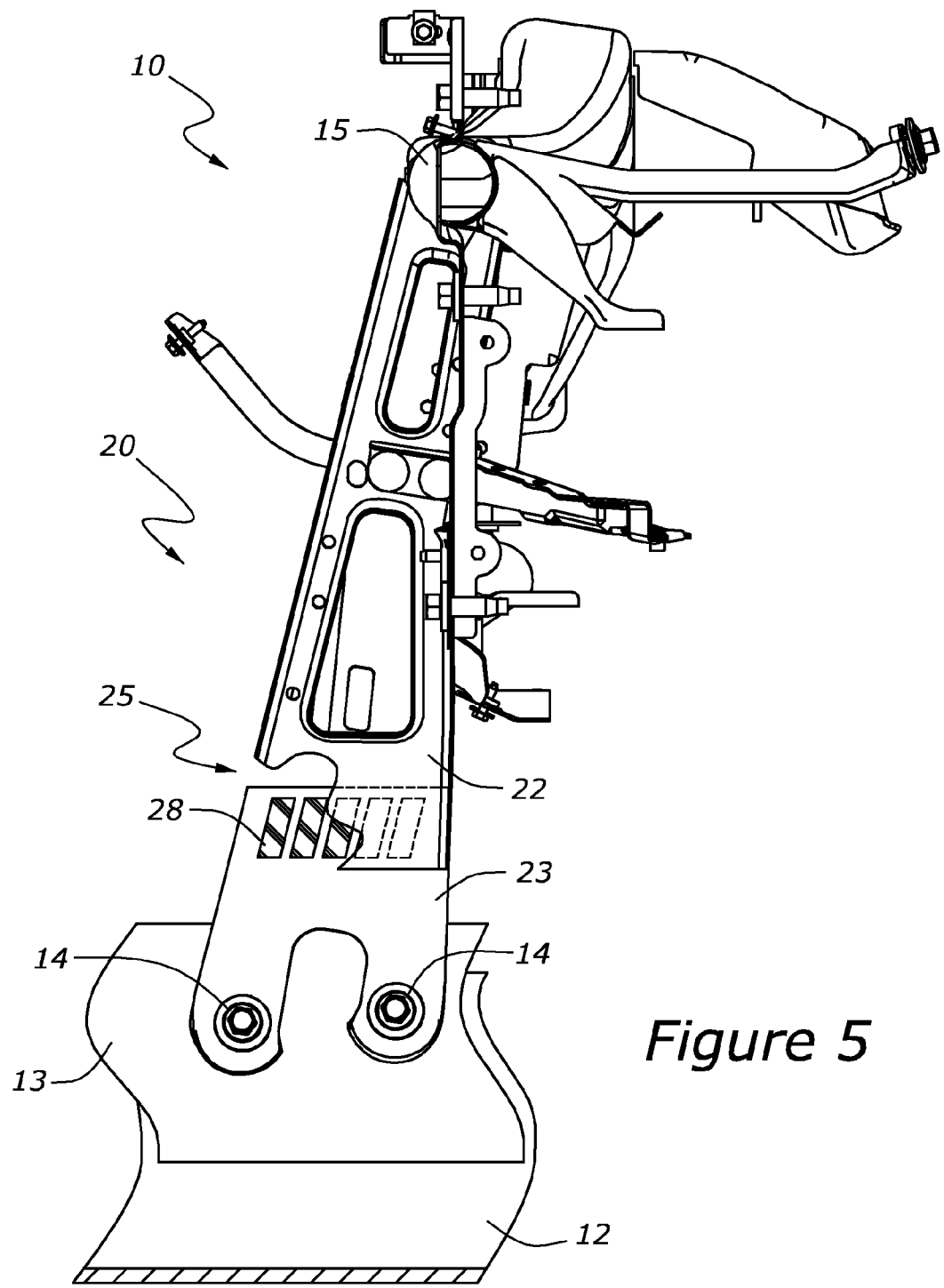
FIG. 5 is an enlarged right side elevational view of the right center support brace, similar to that of FIG. 3, but showing an alternative embodiment of the elastomeric pad joining the upper and lower members of the support brace.

As can be seen in a comparison of FIGS. 3 and 5, the elastomeric pad 27 can be formed as a single member substantially filling the overlap region 25, as is shown in FIG. 1-3, or the elastomeric pad 28 can be segmented as shown in FIG. 4. The segmented elastomeric pad 28 can have a lower material cost and provide essentially the same performance as the single pad member 27. Preferably the individual segments are vertically oriented with vertically extending gaps between the segments so that dirt will fall by gravity between the segments. The durometer rating of the elastomeric pad 27, 28, as well as the thickness of the pad 27, 28, can be selected to provide desired performance in the dampening of vibrations through the support brace 20. Different densities and different thicknesses of the elastomeric pad 27, 28 will be responsive to corresponding vibration frequency ranges.

Figure 6:
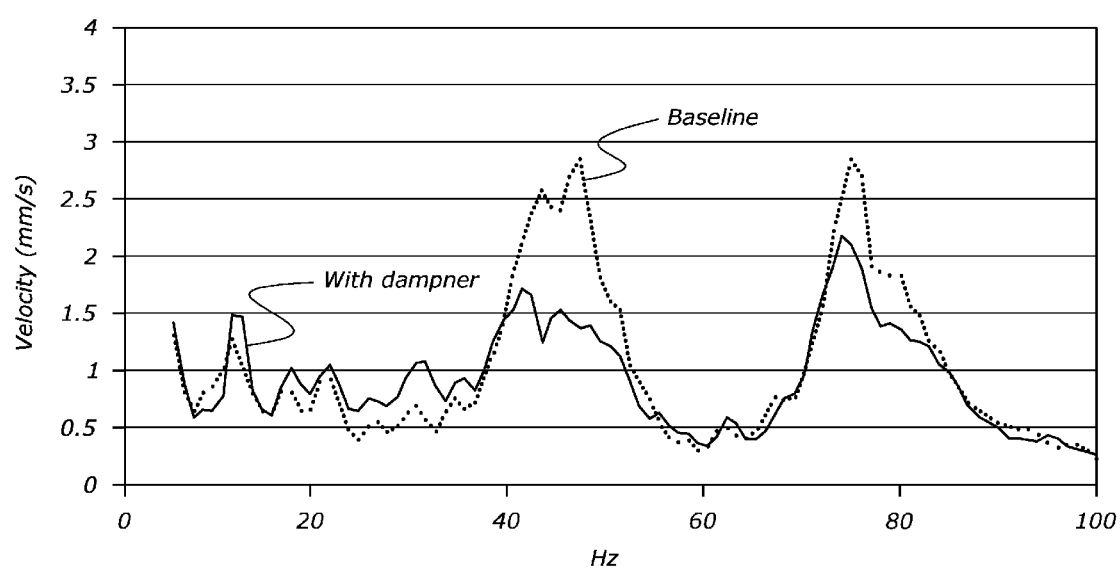
FIG. 6 is a graph showing the results of test indicating the effectiveness of the instant invention in dampening the vibration amplitude in the range of 40 to 80 Hz.

As can be seen in the graph of FIG. 6, the use of the split support brace with the elastomeric pad 27 at the overlap region provides significant vibration dampening results and a perceived improvement by the driver as fewer vibrations reach the steering wheel (not shown) where the vibrations are felt by the operator.

In operation, the pre-assembled support brace 20 is provided to the automotive assembly operation as a substitute for the conventional one-piece support brace. The pre-assembled support brace is connected to the attachment bracket 13 by bolts 14 attaching the lower member 23 directly to the attachment bracket 13, as is previously performed in the assembly operation with the conventional support brace. The pre-assembled support brace 20 is also connected to the lower cross car beam 15 and the upper cross car beam 16 by conventional fasteners, as is previously known in the assembly using the conventional support brace, to provide support for the frame 10 on which the instrument panel (not shown) will be mounted. The integrated elastomeric pad 27, 28 in the overlap region 25 between the upper and lower members 22, 23, dampens the transmission of any vibrations transmitted from the floor pan 12 into the support braces 20, and ultimately, to the steering wheel (not shown).

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

In the way of example, the principles of the instant invention can be utilized in any support brace, particularly for components within the operator cab of the vehicle, where vibrations transmissions need to be controlled to create a perceived difference by the operator. Once such supported component could be rear deck of the automobile, or perhaps an auxiliary instrument mount.

Having thus described the invention, what is claimed is:

1. A support frame for supporting an instrument panel in an automotive vehicle above a floor pan, comprising:
    a cross car beam extending laterally across the vehicle; and
    a pair of support braces with each support brace having an upper member with an upper end connected to the cross car beam and a lower member with an opposing lower end connected to the floor pan, each support brace being formed with a lap joint located between the upper and lower members and including an elastomeric pad positioned between the upper and lower members to separate the upper and lower members and dampen the transmission of vibrations between the upper and lower members, the elastomeric pad allowing a limited amount of vertical movement between the upper and lower members, each support brace having a floating positive mechanical connection including a limit member on one of the upper and lower members received with the other of the upper and lower members to permit the limited amount of vertical movement without contact therebetween, the floating positive mechanical connection restricting the relative movement between the upper and lower members to the limited movement accommodated by the elastomeric pad.

2. The support frame of claim 1 wherein the limit member of the floating positive mechanical connection between the opposing ends of each support brace includes:
    a tab formed on a lower end of the upper member and passing through an opening formed in the lower member.

3. The support frame of claim 2 wherein the tab and the opening are formed in T-shaped configurations with a horizontal head portion and a vertical stem portion oriented vertically.

4. The support frame of claim 3 wherein the elastomeric pad is segmented.

5. The support frame of claim 3 wherein the opening is larger than the corresponding configuration of the tab so that the tab can pass through the opening to provide the floating positive mechanical connection between the upper and lower members without incurring metal-to-metal contact between the tab and the lower member.

6. The support frame of claim 5 wherein the opening is located below the elastomeric pad.

7. In an automotive vehicle having a floor pan and an instrument panel support by a frame structure above the floor pan, the frame structure including a cross car beam extending transversely to support the instrument panel, the improvement comprising:
    a vertically extending support structure interconnecting the cross car beam and the floor pan at a central portion of the instrument panel, and including a support brace having an upper member connected at an upper end thereof to the cross car beam and a lower member connected at a lower end thereof to the floor pan and defining a lap joint between the upper and lower members in which is positioned an elastomeric pad to dampen vibrations transferred from the floor pan to the cross car beam, the support structure incorporating a floating positive mechanical connection to prevent the cross car beam from collapsing onto the floor pan upon a failure of the elastomeric pad, the floating positive mechanical connection including a tab formed on one of the upper and lower members that passes through an opening formed in the other of the upper and lower members, the tab being positioned in a non-contact arrangement with the other of the upper and lower members until the elastomeric pad fails.

8. The automotive vehicle of claim 7 wherein the tab is formed on a lower end of the upper member and passes through an opening formed in the lower member.

9. The automotive vehicle of claim 8 wherein the tab and the opening are formed in T-shaped configurations with a horizontal head portion and a vertical stem portion.

10. The automotive vehicle of claim 9 wherein the support structure includes a pair of the support braces formed with respective lap joints.

11. The automotive vehicle of claim 10 wherein the opening is larger than the corresponding configuration of the tab so that the tab can pass through the opening to provide the floating positive mechanical connection between the upper and lower members without incurring metal-to-metal contact between the tab and the lower member.

12. The support frame of claim 11 wherein the opening is located below the elastomeric pad.

13. A support frame for supporting an instrument panel in an automotive vehicle above a floor pan, comprising:
a cross car beam extending laterally across the vehicle; and
a pair of support braces with each support brace including:
an upper member having a upper end connected to the cross car beam and an opposing lower overlap region;
a lower member having a lower end connected to the floor pan and an opposing upper overlap region that is formed to correspond to the lower overlap region of the upper member to define a lap joint between the upper and lower members; and
an elastomeric pad connected to the upper and lower overlap regions of the lower and upper members to separate the upper and lower members and dampen the transmission of vibrations from the lower member to the upper member; and
a floating positive mechanical connection at the lap joint between the opposing overlap regions of the upper and lower members of each support brace, the floating positive mechanical connection including a tab formed on one of the upper and lower members and passing through an opening formed in the other of the upper and lower members.

14. The support frame of claim 13 wherein the tab is formed on a lower end of the upper member and passes through an opening formed in the lower member.

15. The support frame of claim 14 wherein the tab and the opening are formed in T-shaped configurations with a horizontal head portion and a vertical stem portion oriented vertically.

16. The support frame of claim 15 wherein the elastomeric pad is segmented.

17. The support frame of claim 16 wherein the opening is larger than the corresponding configuration of the tab so that the tab can pass through the opening to provide the floating positive mechanical connection between the upper and lower members without incurring metal-to-metal contact between the tab and the lower member.

18. The support frame of claim 17 wherein the opening is located below the elastomeric pad.

* * * * *